United States Patent [19]

Kutschker

[11] Patent Number: 5,887,861
[45] Date of Patent: Mar. 30, 1999

[54] WORKPIECE STOP DEVICE

[75] Inventor: Wolfgang Kutschker, Boeblingen, Germany

[73] Assignee: Reinhardt Maschinenbau GmbH, Sindelfingen, Germany

[21] Appl. No.: 826,783

[22] Filed: Apr. 7, 1997

Related U.S. Application Data

[63] Continuation of PCT/EP96/02555 Jun. 13, 1996.

[30] Foreign Application Priority Data

Aug. 11, 1995 [DE] Germany ............... 195 29 570.6

[51] Int. Cl.$^6$ ............................................. B23Q 3/00
[52] U.S. Cl. ........................ 269/303; 269/304; 269/319
[58] Field of Search .................... 269/303–306, 269/315–320

[56] References Cited

U.S. PATENT DOCUMENTS

| | | | |
|---|---|---|---|
| 971,196 | 9/1910 | Repp | 269/309 |
| 2,953,174 | 9/1960 | Wilkins | 269/303 |
| 4,027,591 | 6/1977 | Gubela | 269/319 |
| 4,466,601 | 8/1984 | Raines | 269/303 |

FOREIGN PATENT DOCUMENTS

| | | |
|---|---|---|
| 1338361 | 1/1964 | France . |
| 2052109 | 4/1971 | France . |
| 2 017 474 | 11/1971 | Germany . |
| 36 37 713 | 5/1988 | Germany . |

*Primary Examiner*—Robert C. Watson
*Attorney, Agent, or Firm*—Barry R. Lipsitz; Ralph F. Hoppin

[57] ABSTRACT

In order to improve a workpiece stop device for a machine tool, in particular, a sheet metal working machine, comprising a support frame, an adjustment carriage displaceable on the support frame in a stop direction and a stop element movable by the adjustment carriage, such that this is, from a constructional point of view, of as simple a design as possible and offers the possibility of making use of as large a stop area as possible it is suggested that the stop element have a stop arm which is provided with at least two stop surfaces arranged at a distance from one another in a stop direction, and that the stop element can be brought into a first position, in which a first stop surface arranged closest to the machine tool is in the active position, and can be brought into a second active position, in which a second stop surface is in the active position while the stop surfaces located on the machine tool side thereof are in the inactive position.

27 Claims, 6 Drawing Sheets

WORKPIECE STOP DEVICE

This application is a continuation of PCT/EP96/02555 filed Jun. 13, 1996.

BACKGROUND OF THE INVENTION

The invention relates to a workpiece stop device for a machine tool, in particular a sheet metal working machine, comprising a support frame, an adjustment carriage displaceable on the support frame in a stop direction and at least one stop element movable by the adjustment carriage in stop direction and having at least one stop surface, wherein the stop surface is adapted to be brought by a movement of the stop element from an inactive position arranged beneath a bearing surface into an active position protruding above the bearing surface.

Workpiece stop devices of this type are known from German patent No. 20 17 474.

In the case of these stop devices, the adjustment carriage forms a table with stop elements arranged in rows, wherein one row of stop elements can be brought into the active position.

A workpiece stop device of this type is expensive to produce.

SUMMARY OF THE INVENTION

The object underlying the invention is, therefore, to improve a workpiece stop device of the generic type such that this is, from a constructional point of view, of as simple a design as possible and, nevertheless, offers the possibility—as in German patent No. 20 17 474—of making use of as large a stop area as possible despite a displacement of the adjustment carriage over a small distance, this stop area being considerably larger than the adjustment path of the adjustment carriage.

This object is accomplished in accordance with the invention, in a workpiece stop device of the type described at the outset, in that the stop element has a stop arm which is provided with at least two stop surfaces arranged at a distance from one another in a stop direction, and that the stop element can be brought into a first position, in which a first stop surface arranged closest to the machine tool is in the active position, and can be brought into a second position, in which a second stop surface is in the active position while the stop surfaces located on the machine tool side thereof are in the inactive position.

The advantage of the inventive solution is to be seen in the fact that this can be of a very simple construction since only one pivot drive is required for at least two active positions whereas, in the case of the solution known from the state of the art, one drive was necessary for transferring one row of stop surfaces into their active position.

In addition, the control resources can also be restricted since only one pivot drive is activatable and thus the only necessity which exists is of interrogating and recording its positions.

Finally, the inventive solution has the great advantage that it opens up the possibility of finding an optimum compromise between the resources for the displacement of the adjustment carriage and the resources for the activation of the stop surfaces.

The adjustability of the stop arm can be realizable in the most varied of ways. For example, an adjustability of the stop arm by means of a key-type drive is possible. A particularly advantageous and constructionally simple solution provides for the stop arm to be pivotable about a pivot axis.

With respect to the arrangement of the stop arm relative to the pivot axis, all possibilities are conceivable. It would, for example, be possible for the stop arm to extend in a direction away from the pivot axis. It is, however, particularly advantageous for the stop arm to extend on both sides of the pivot axis since the movements for transferring the individual stop surfaces into the active position can then be realized particularly favorably.

The inventive solution is advantageously optimized, in particular, when the first and the second stop surfaces have a distance from one another which is greater than approximately half, even better greater than approximately two thirds of an adjustment path of the adjustment carriage.

In this respect, it is particularly expedient when stop surfaces following one another in stop direction have a respective distance from one another which is smaller than or approximately equal to the adjustment path of the adjustment carriage since, in this case, a gap-free abutment of a workpiece is possible over a distance which corresponds to the sum of the adjustment path and the distance between the stop surfaces.

In this respect, it is particularly advantageous, in particular in order to be able to abut sheet bars of different widths, when a plurality of stop elements are arranged at a distance from one another in a transverse direction extending transversely to the stop direction.

In order to simplify the activation of these stop elements, which could, in principle, each be pivotable by means of its own drive, it is advantageous when the plurality of stop elements are pivotable together in order to bring the same respective stop surface into the active position.

It is thereby preferably provided for several stop elements to be seated on a pivotable stop carrier extending in the transverse direction.

Such a stop carrier bearing all the stop elements arranged next to one another in the transverse direction is preferably designed such that it is pivotally mounted on the adjustment carriage.

A particularly expedient mounting of the stop carrier provides for this to be mounted with its end regions located opposite one another on respective adjustment carriages. This construction allows the stop carrier to be guided and positioned exactly.

A particularly exact guidance is possible when the two adjustment carriages are actively movable in the stop direction synchronously with one another so that an active parallel guidance of the stop carrier in all the positions of the adjustment carriage is thereby possible.

A particularly advantageous embodiment which allows, in particular, an adaptation to different sheet bar widths provides for the stop elements to be positionable in different positions on the stop carrier in transverse direction.

Such a positioning of the stop elements would, for example, be possible in that these are insertable into receiving means on the stop carrier at predetermined pattern distances.

However, an embodiment is particularly expedient, in which the stop elements are arranged for displacement in a transverse guide means of the stop carrier so that a continuous positioning of the stop elements in the transverse direction is possible.

In conjunction with the preceding explanations concerning the individual embodiments, only the provision of two stop surfaces has been assumed. The inventive solution may, however, be used particularly advantageously when the stop arm has at least three stop surfaces arranged one behind the other in stop direction and is movable such that the workpiece can abut on each of the stop surfaces without any hindrance by the stop surfaces located on the machine tool side thereof. With this solution, the advantage attained in accordance with the invention may be multiplied and so the adjustment path of the adjustment carriage can be kept relatively small and a large stop area can be realized by means of the three stop surfaces on each stop element.

With respect to the design of the stop elements and the arrangement of the stop surfaces on them, no details have been given in conjunction with the preceding explanations concerning the individual embodiments. A solution which is particularly simple to produce provides, for example, for the stop element to bear a first stop surface at its front end face and in a rear region a stop member having the other stop surface.

The stop member is expediently designed such that it rises above the stop arm and bears on its end face the other stop surface extending transversely to the stop direction.

In the simplest case, the stop arm is designed as an elongated bar which bears the one stop surface on its end face and is provided, in particular, at its rear face with an elevation which bears the other stop surface on its end face.

A particularly advantageous solution, in particular one which allows the displacement of sheet bars even with second stop surfaces protruding above the bearing surface, provides for the stop member, when seen in stop direction, to have a cross-sectional shape with upwardly inclined side bevels, for example one which is essentially triangular or trapezoidal.

With respect to the design of an adjustment drive for the positioning of the adjustment carriage, no details have likewise been given in conjunction with the preceding explanations concerning the individual embodiments. It would, for example, be possible to design the adjustment drive as a worm drive.

It is, however, particularly advantageous, in particular for reasons of constructional simplicity, when the adjustment drive is designed as a worm, chain or belt drive, in particular with a pretensioned belt.

A particularly expedient embodiment of the inventive solution provides for the workpiece stop device to form a table which defines the bearing surface for workpieces, in particular sheet bars.

Such a table is preferably designed such that it has a table framework, into which table plates can be inserted in different positions in a transverse direction.

The table plates are designed, in particular, to be strip-like and extend in stop direction, wherein they can be placed on the table framework with a front side and a rear side.

The inventive stop elements may be positioned particularly favorably when a space is present between table plates which are located next to one another in transverse direction and insertable, in particular, in different positions, one of the stop elements being displaceable in stop direction in this space.

Additional features and advantages of the invention are the subject matter of the following description as well as the drawings illustrating one embodiment.

DETAILED DESCRIPTION OF THE INVENTION

Figure 1:
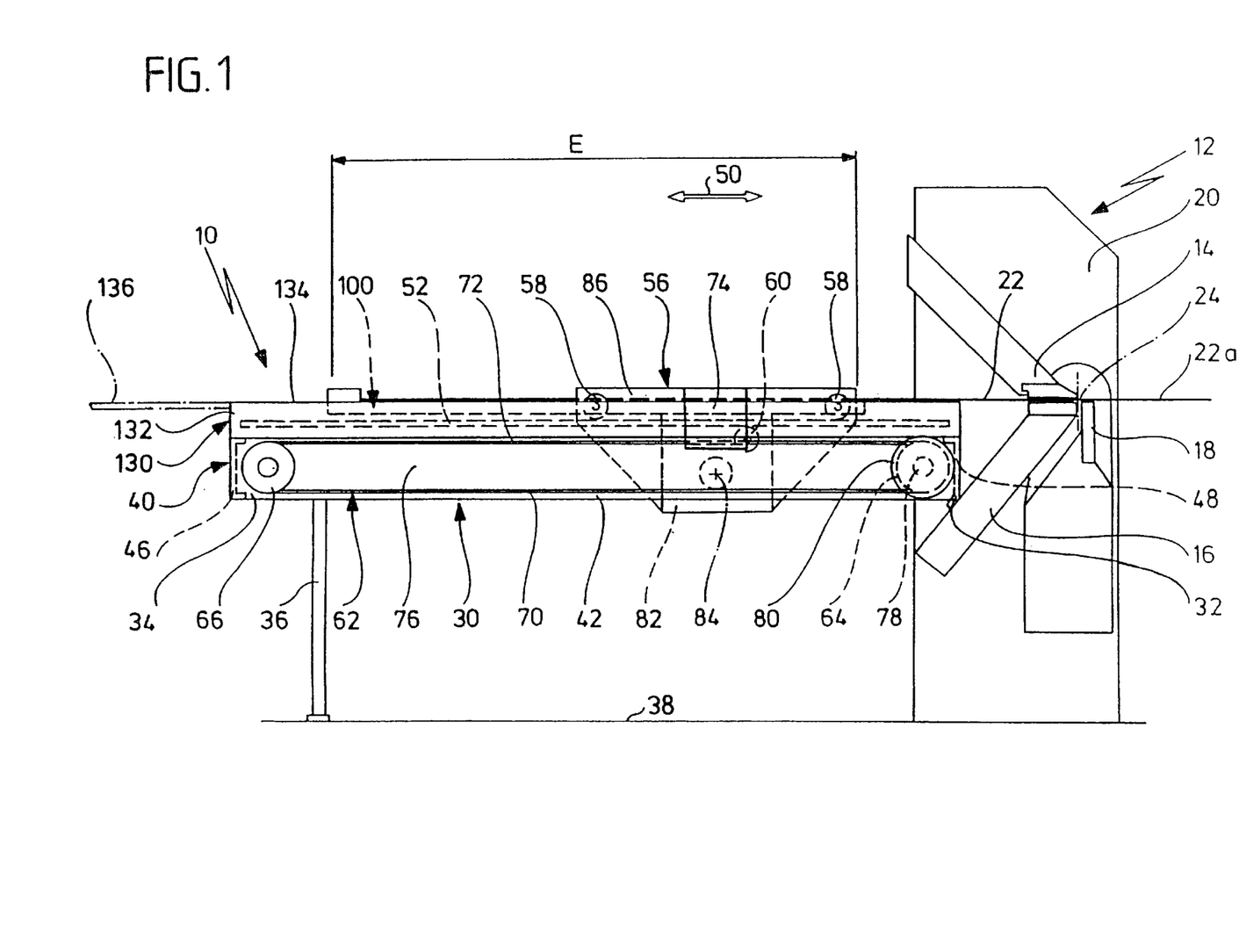
FIG. 1 shows a side view of a first embodiment of an inventive workpiece stop device for a sheet metal working machine.
Figure 2:
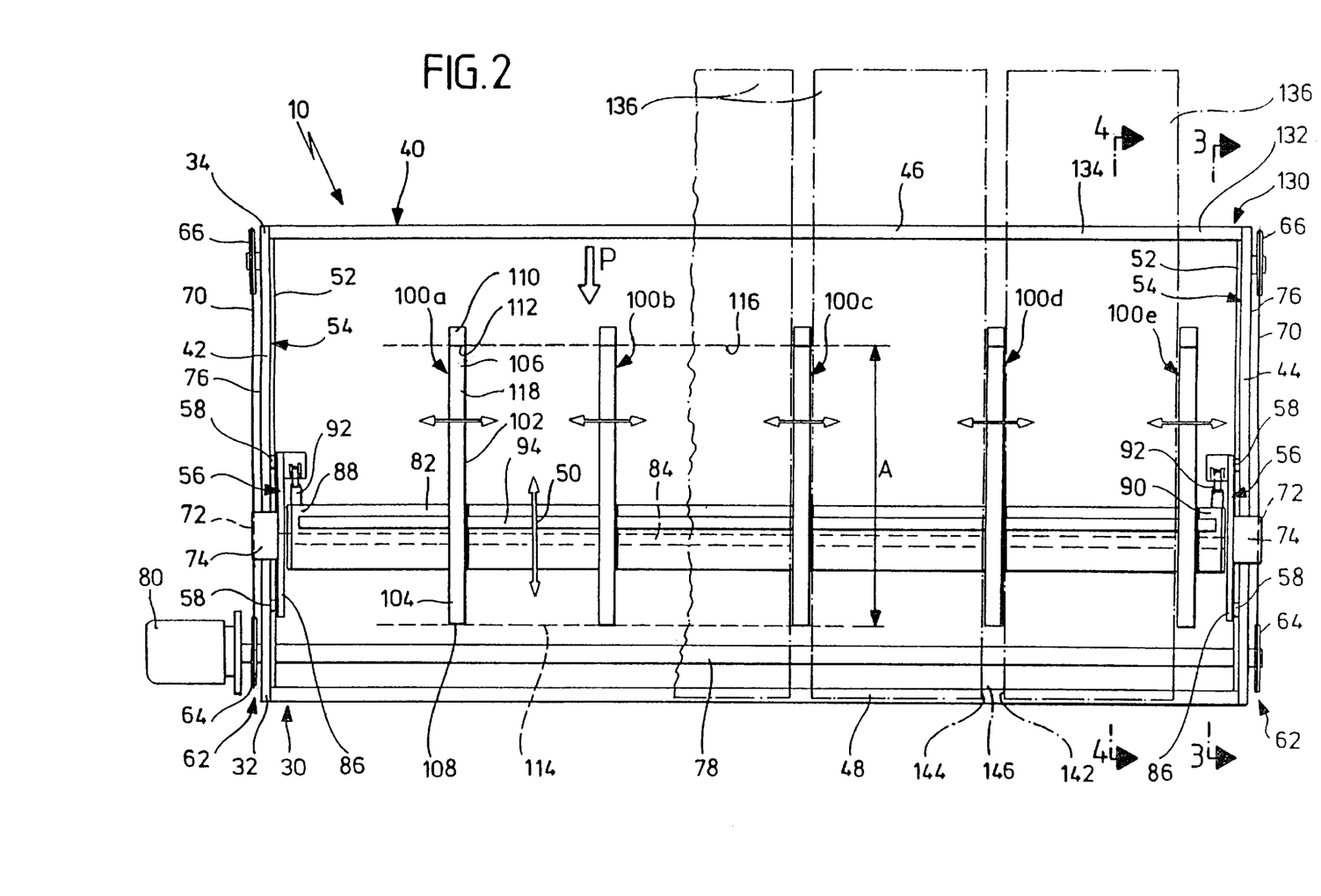
FIG. 2 shows a plan view of an inventive workpiece stop device according to FIG. 1.

One embodiment of a stop device, illustrated in FIGS. 1 and 2 and designated as a whole as 10, is preferably provided for attachment to a sheet metal working machine designated as a whole as 12 in FIG. 1, a plate bending machine being illustrated as an example for such a sheet metal working machine. This machine has an upper beam 14, a lower beam 16 and a bending beam 18 which are all held on a machine frame 20, wherein the upper beam 14 and the lower beam 16 are adjustable in their height for securing a sheet bar 22 in position relative to the machine frame 20 whereas the bending beam 18 is preferably pivotable about a pivot axis 24 for bending over a front region 22a of the sheet bar 22.

The stop device 10 comprises, for its part, a support frame designated as a whole as 30 which can either be a separate stand or, as illustrated in FIG. 1, be supported with a front region 32 on the lower beam 16 and, for example, be supported in a rear region 34 by a stand 36 on a floor surface 38. However, a cantilever attachment of the support frame 30 on the machine frame 20 or on the lower beam 16 is also possible.

As illustrated, in particular, in FIG. 2, the support frame comprises a supporting framework 40 which has two side supports 42 and 44 aligned parallel to one another as well as two cross supports 46 and 48 extending parallel to one another. In this respect, in the case illustrated in FIG. 1 the front cross support 48 rests on the lower beam 16 and extends parallel to the pivot axis 24 and thus at right angles to a stop direction which is designated as a whole as 50 and in which the stop device 10, as will be described in detail later on, is operative for abutting the sheet bar 22.

Figure 3:
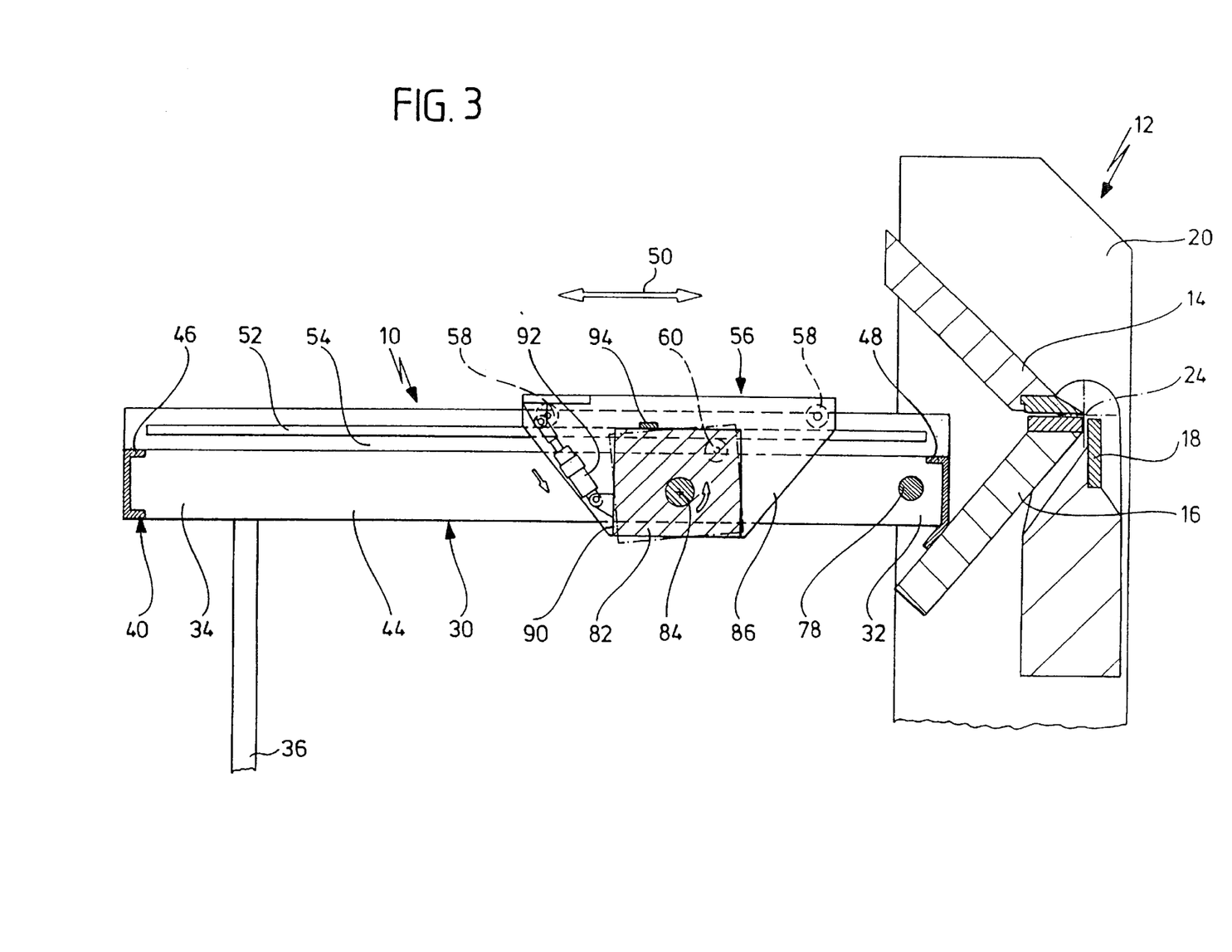
FIG. 3 shows a section along line 3—3 in FIG. 2.

The side supports 42 and 44 thus extend preferably parallel to the stop direction 50 and are, in addition and as illustrated in FIGS. 2 and 3, each provided with a longitudinal guide means 52 which extends parallel to the stop direction 50 and is preferably arranged on the inner side 54 of the respective side support 42, 44 facing the respectively other side support 44, 42. An adjustment carriage designated as a whole as 56 is guided for displacement on this longitudinal guide means 52, for example, by means of upper rollers 58 and lower rollers 60.

The two adjustment carriages 56 arranged on the oppositely located side supports 42, 44 are, as illustrated in FIG. 1, synchronously displaceable in the guiding direction of the longitudinal guide means 52 by way of a respective adjustment drive designated as a whole as 62. Each adjustment drive 62 has, for example, a front chain wheel 64 arranged near to the front cross support 48 and a rear chain wheel 66 arranged near to the rear cross support 46, an endless chain 70 running over these wheels. In this respect, an upper chain strand 72 is, for example, connected to an entraining bracket 74 which extends from the adjustment carriage 56 running along the inner side 54 of the respective side support 42, 44, beyond the respective side support 42, 44 as far as the adjustment drive 62 preferably arranged on an outer side 76 of the respective side support 42, 44 and engages on the upper chain strand 72 extending parallel to the outer side 76.

The two front chain wheels 64 are, as illustrated in FIG. 2, preferably seated on and driven by a common drive shaft 78, the drive shaft 78 thereby being driven by an adjustment motor 80.

Due to the fact that an adjustment drive 62 is arranged on each of the side supports 42, 44 and the two adjustment drives 62 are driven synchronously by means of the drive shaft 78 and the adjustment motor 80, the two adjustment carriages 56 can be positioned in the stop direction 50 synchronously to one another.

A stop carrier 82 extends between the two adjustment carriages 56. This stop carrier extends parallel to the cross supports 46, 48 and is also preferably aligned parallel to the pivot axis 24 of the sheet metal working machine 12, namely in all positions of the adjustment carriages 56.

The stop carrier 82 is, as illustrated in FIG. 3, pivotable relative to the adjustment carriages 56, preferably to their base plate 86, about a pivot axis 84 which likewise extends parallel to the cross supports 46, 48 and preferably also parallel to the pivot axis 24 of the sheet metal working machine 12. For this purpose, a pivot drive 92, preferably designed as a pneumatic cylinder, is arranged in the region of both ends 88, 90 of the stop carrier 82. This pivot drive engages, on the one hand, on the stop carrier 82 with, for example, a cylinder housing and, on the other hand, on the respective adjustment carriage 56, in particular the base plate 86 thereof, with, for example, a piston rod and is thus in a position to pivot the stop carrier 82 as a whole between at least two end positions.

Figure 4:
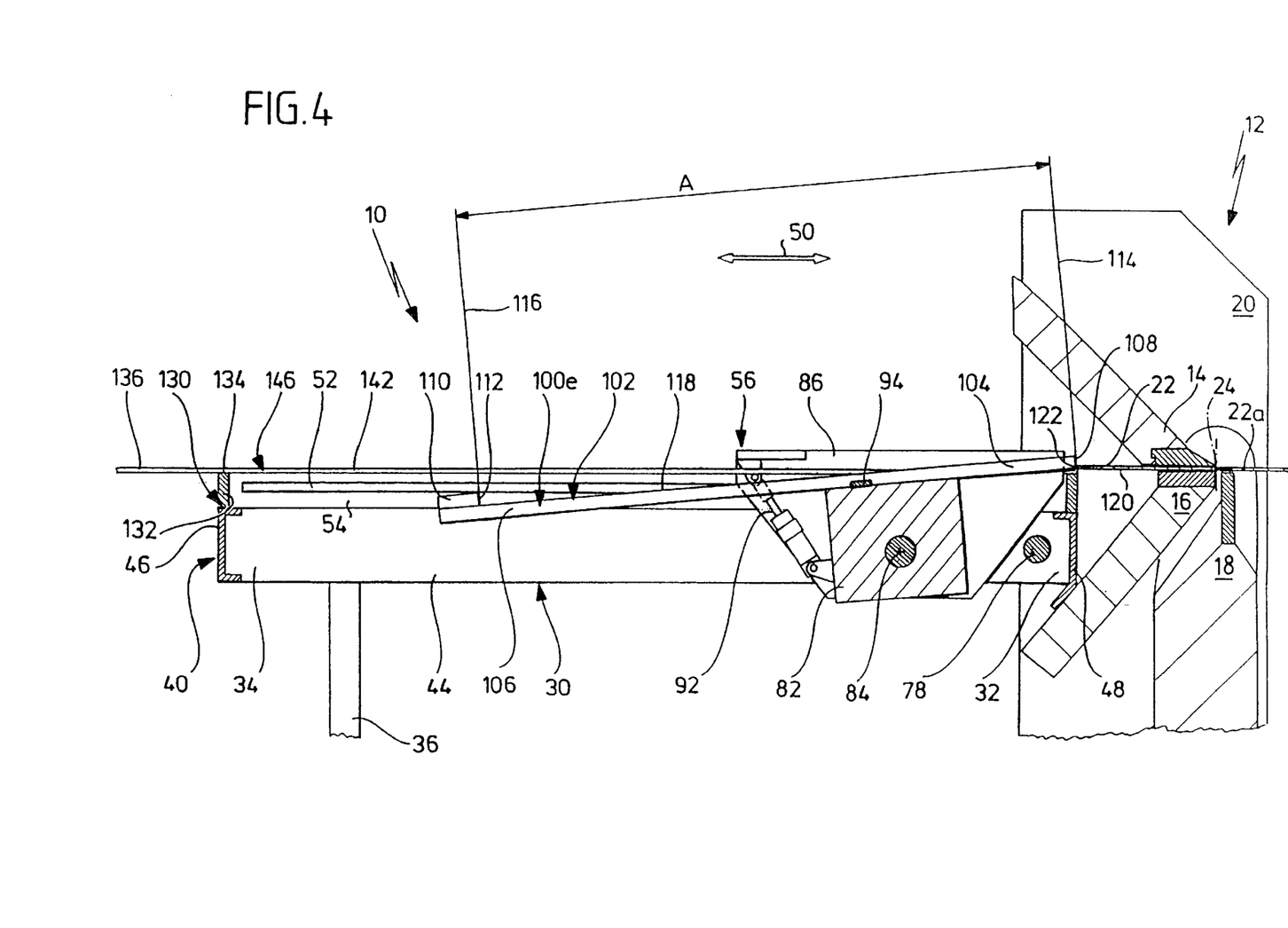
FIG. 4 shows a section along line 4—4 in FIG. 2 in a first active position.
Figures 5, 6:
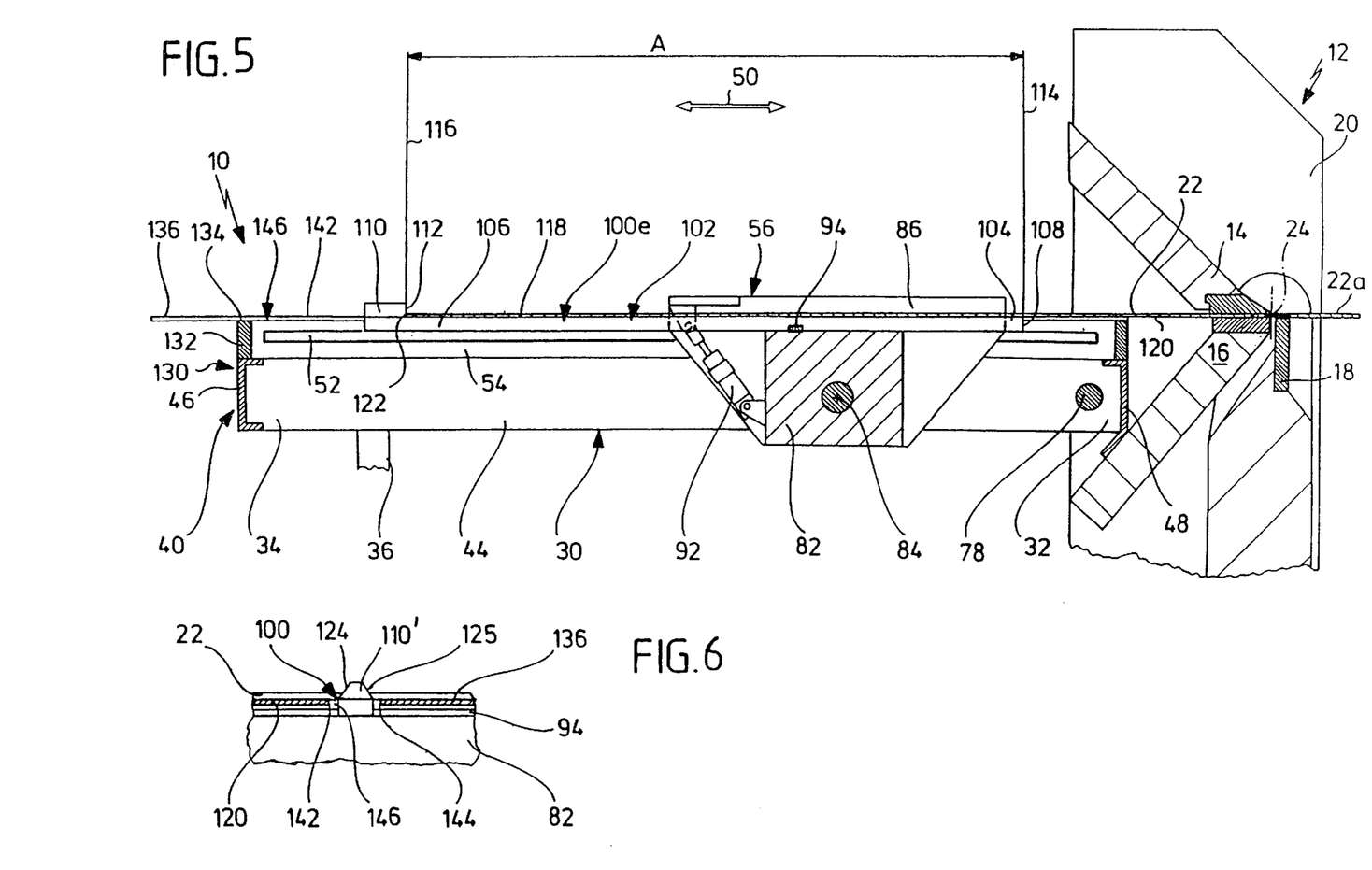
FIG. 5 shows a section similar to FIG. 4 in a second active position.
FIG. 6 shows a view from behind of a variation of a stop element in the direction of arrow P in FIG. 2

The stop carrier 82 has, for its part, a transverse guide means which is designated as 94 and extends parallel to the pivot axis 84 and in which a plurality of stop elements, which are displaceable in the longitudinal direction of the transverse guide means 94, i.e. parallel to the pivot axis 24, but are otherwise, as illustrated in FIGS. 4 and 5, fixed against rotation and thus pivotable together with the stop carrier 82 about the pivot axis 84, can be fixed in position in the longitudinal direction of the transverse guide means 94.

Each of these stop elements 100 comprises, as illustrated in FIGS. 4 and 5, a stop arm 102 which extends with a front region 104 in the direction of the sheet metal working machine 12 and with a rear region 106 away from this.

The front region 104 thereby has a front stop surface 108 formed by a front end face of the stop arm 102 and the rear region 106 of the stop arm 102 bears a stop member 110 which projects upwards above the rear region 106 in the direction of the sheet bar 22 and bears a rear stop surface 112 on its end face.

Both the front stop surfaces 108 and the rear stop surfaces 112 of all the stop elements 100 are respectively located on a common stop line 114 or 116 which extends parallel or at an angle to the pivot axis 84 of the stop carrier 82.

If the respective stop arm 102 is thereby pivoted into a second, active position which is illustrated in FIG. 5 and in which an upper edge 118 of each stop arm 102 extends beneath or at the most at the level of a bearing surface 120 for the sheet bar, the stop member 110 protrudes above the bearing surface 120 for the sheet bar 22 and thus also its rear stop surface 112, against which the sheet bar 22 can be positioned with a rear edge 122, for example, at a desired, defined distance from the pivot axis 24 of the sheet metal working machine 12.

This means that in the second, active pivot position of the stop arms their respective, rear stop surfaces 112 are operative and so the rear stop line 116 defines the position of the rear edge 122 of the sheet bar 22.

By pivoting the entire stop carrier 82 into a first, active pivot position, the stop member 110, as illustrated in FIG. 4, can be lowered beneath the bearing surface 120 while, in a countermove, the front region 104 of each stop arm 102 then projects with the front stop surface 108 above the bearing surface 120 for the sheet bar and thus the front stop line 114 is decisive for an abutment of the rear edge 122 of the sheet bar 22.

The front stop surfaces 108 and the rear stop surfaces 112 preferably have a distance A from one another which is at the most equal to or smaller than an adjustment path E, within which the stop carrier 82 can be moved as a whole in the stop direction 50 by means of the adjustment carriage 56. The possibility is thus created, depending on whether the stop elements 100 are in the first or in the second, active position, of positioning the rear edge 122 of the sheet bar 22 in a defined manner within a stop area of the length E+A, whereby the adjustment carriages 56 are to be positioned each time within the adjustment path E, whereas an extension or reduction of the stop area by the distance A takes place by pivoting the entire stop carrier 82 with all the stop elements 100 into the first or second, active position by means of the pivot drives 92.

At the same time, it is possible to set the position of the stop elements 100 along the stop carrier 82 as desired by displacing these elements within the transverse guide means 94.

In a variation of the first embodiment, it is also possible to provide, in addition to the first and second, active positions of the stop elements 100, a third inactive position for them, in which none of the stop surfaces 108 or 112 project above the bearing surface 120. This variation offers the possibility of arranging several rows of stop elements 100 to follow one another in a stop direction and to bring only the front or rear stop surfaces of one of the rows into the active position.

The support frame 30 of the inventive stop device 10 is also preferably designed as a table 130 which extends with a table framework 132 in the adjustment direction 50 over the support frame 30 at least to such an extent that in all the positions of the stop surfaces 108, 112 the stop lines 114 and 116, respectively, are still located on a table surface 134 which defines the bearing surface 120 for the sheet bars 22. The table surface is thereby formed by strip-like table plates 136 which can be inserted into the table framework 132, preferably extend between the front cross support 48 and the rear cross support 46 of the support frame 40 and rest on these. The strip-like table plates 136 are preferably inserted into the support frame 40 such that a strip-like space 146 remains between adjacent side edges 142 and 144, respectively, of table plates 136 located next to one another. This space 146 extends in the stop direction 50 between the front cross support 48 and the rear cross support 46 so that at least one stop element can be moved in this space 146 between two table plates 136 by moving the stop carrier 82 in the stop direction 50.

The table plates 136 are preferably insertable into the support frame 40 in optional positions in transverse direction and/or available in optional widths transversely to the stop direction 50 so that it is always possible to position the respective stop elements 100 in a manner required for an optimum abutment of the rear edge 122 of the sheet bar 22.

In a particularly preferred variation of the first embodiment of an inventive stop device, the stop member 110' is, as illustrated in FIG. 6, designed in cross section, namely when viewed in the stop direction 50, to be trapezoidal or triangular, semicircular or semi-oval, wherein the two inclined surfaces 124 and 125 of the stop member serve as abutting surfaces in the case where this rises above the bearing surface 120 in order either to displace sheet bars 22 resting on the bearing surface 120 transversely to the adjustment direction 50 or to be able to turn them about an axis at right angles to the bearing surface 120 despite a stop member 110' projecting above the bearing surface 120. In a second embodiment, illustrated in FIG. 7, each of the stop elements 100' has three stop surfaces seated on the stop arm 102', namely the stop surfaces 108 and 112 and, in addition, a third stop surface 126, which are all arranged at a distance A from one another which is dimensioned in the same manner as in the first embodiment.

Figure 7:
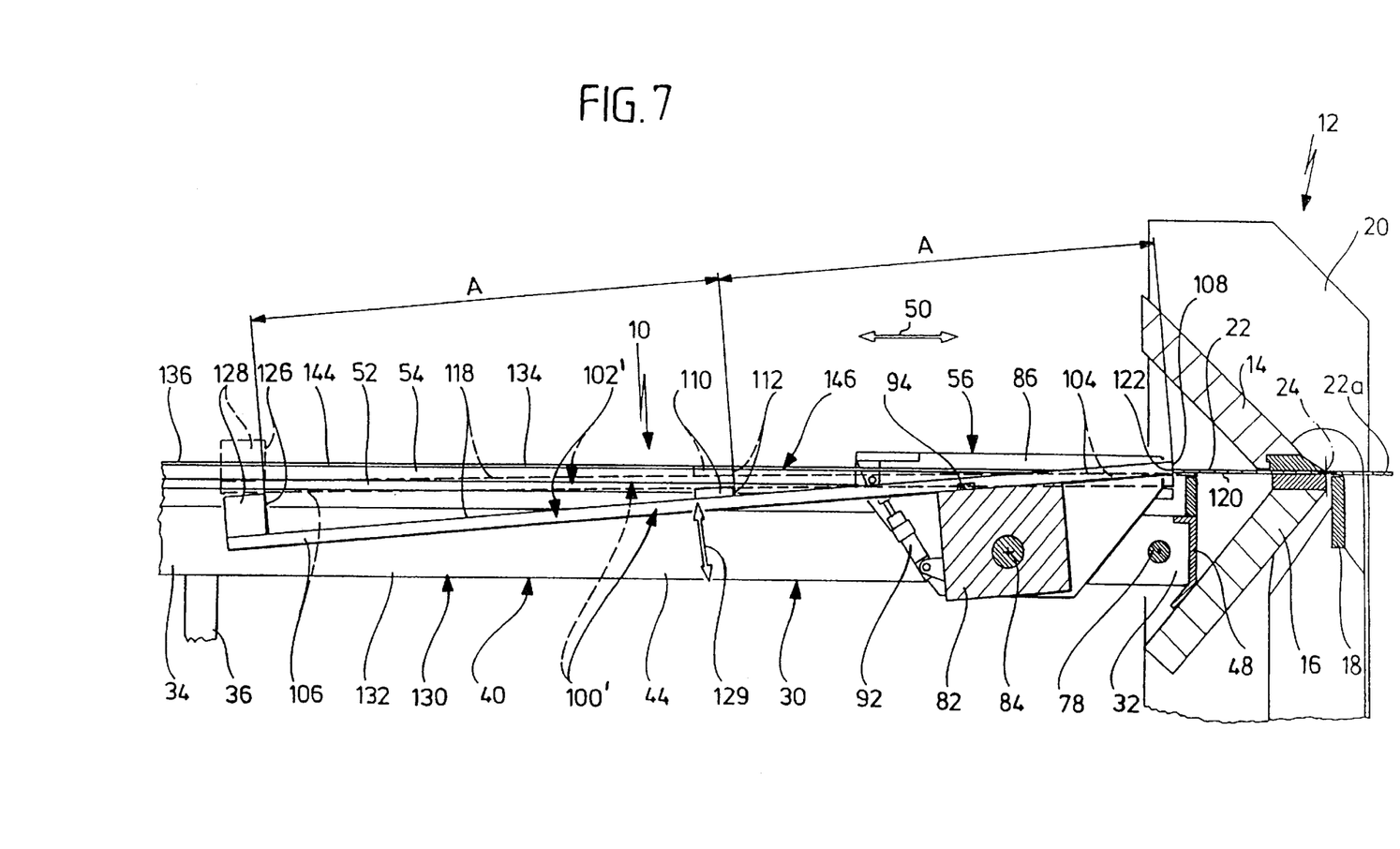
FIG. 7 shows a section similar to FIG. 4 through a second embodiment.

The third stop surface 126 is the rearmost of the stop surfaces and arranged on a stop member 128 such that, in a third, active position of the stop element 100', it projects above the bearing surface 120 when the first and the second stop surfaces 108, 112 are still located beneath the bearing surface 120, as indicated by dashed lines in FIG. 7. When the stop element 100' is pivoted proceeding from the first position illustrated in FIG. 7 in the direction of the arrow 129, the third, active position of the stop element 100' is first reached (illustrated by dashed lines in FIG. 7) and then the second, active position, in which the stop surface 112—similar to the illustration of FIG. 5—is operative. In this second, active position, the stop surface 126 does likewise project above the bearing surface 120 but this is, however, without significance since the stop surface 112 located in front of it is already operative.

The pivot drive 92 is designed in this embodiment such that it can be adjusted into three defined positions, for which purpose a double cylinder is, for example, suitable.

As for the rest, the second embodiment is identical to the first embodiment and so reference is made in full to the explanations concerning this embodiment.

What is claimed is:

1. A workpiece stop device for a machine tool, comprising:
   a support frame,
   an adjustment carriage displaceable on the support frame in a stop direction by an adjustment drive, and
   at least one stop element movable by the adjustment carriage, wherein:
   said stop element comprises a stop arm,
   said stop arm is provided with at least first and second stop surfaces arranged at a distance from one another in a stop direction,
   said first stop surface is arranged closer than said second stop surface to the machine tool,
   said second stop surface is adapted to be brought by a movement of the stop element into an active position, where said second stop surface is protruding above a bearing surface, and
   said first stop element is adapted to be brought into:
   (a) a first position, in which said first stop surface is in an active position, and
   (b) a second position, in which said second stop surface is in the active position thereof while said first stop surface is in an inactive position, beneath the bearing surface.

2. A workpiece stop device as defined in claim 1, wherein the stop arm is pivotable about a pivot axis, said pivot axis extending in a transverse direction that is transverse to said stop direction.

3. A workpiece stop device as defined in claim 2, wherein the stop arm extends on both sides of the pivot axis.

4. A workpiece stop device as defined in claim 1, wherein said distance is greater than approximately half an adjustment path of the adjustment carriage.

5. A workpiece stop device as defined in claim 1, wherein said distance is smaller or approximately equal to an adjustment path of the adjustment carriage.

6. A workpiece stop device as defined in claim 2, wherein:
   a plurality of stop elements are arranged at a distance from one another in said transverse direction.

7. A workpiece stop device as defined in claim 1, wherein:
   a plurality of stop elements are arranged at a distance from one another in a transverse direction that is transverse to said stop direction; wherein:
   the stop elements are seated on a stop carrier extending in said transverse direction.

8. A workpiece stop device as defined in claim 7, wherein:
   said stop elements are non-pivotable with respect to said stop carrier; and
   said stop carrier is pivotably mounted on the adjustment carriage for providing a common pivoting movement of said stop elements with respect to said adjustment carriage.

9. A workpiece stop device as defined in claim 8, wherein the stop carrier is mounted with end regions located opposite one another on respective adjustment carriage elements of said adjustment carriage.

10. A workpiece stop device as defined in claim 9, wherein the respective carriages are displaceable in the stop direction synchronously with one another.

11. A workpiece stop device as defined in claim 7, wherein the stop elements are adapted to be positioned in different positions on the stop carrier in said transverse direction.

12. A workpiece stop device as defined in claim 11, wherein the stop elements are arranged for displacement in a transverse guide means of the stop carrier.

13. A workpiece stop device as defined in claim 2, wherein the stop arm has a plurality of stop surfaces, including at least three stop surfaces arranged one behind the other in said stop direction, and is movable such that a workpiece is adapted to abut on a selected one of the stop surfaces without any hindrance by the stop surfaces located on the machine tool side of said selected one.

14. A workpiece stop device as defined in claim 13, wherein the stop element comprises:
   a front end face that bears a first stop surface on a front end face, and
   a rear region that bears at least one stop member having one stop surface.

15. A workpiece stop device as defined in claim 14, wherein said at least one stop member is designed such that it rises above the stop arm and bears on its end face the stop surface extending transversely to said stop direction.

16. A workpiece stop device as defined in claim 13, wherein the stop arm is designed as an elongated bar bearing the first stop surface on its end face.

17. A workpiece stop device as defined in claim 15, wherein the stop member has a cross-sectional shape with upwardly inclined side bevels when viewed in said stop direction.

18. A workpiece stop device as defined in claim 1, wherein said adjustment drive comprises one of a worm, chain and belt drive.

19. A workpiece stop device as defined in claim 1, comprising a table defining said bearing surface for supporting workpieces.

20. A workpiece stop device as defined in claim 19, wherein said table has a table framework into which table plates are insertable in different positions in a transverse direction.

21. A workpiece stop device as defined in claim 20, wherein a space is provided between table plates located next to one another in said transverse direction, one of the stop elements being displaceable in said stop direction in said space.

22. A workpiece stop device as defined in claim 1, wherein:

said second stop surface is adapted to be brought by movement of said stop element into said active position thereof from an inactive position thereof where said second stop surface is arranged beneath the bearing surface.

23. A workpiece stop device for a machine tool, comprising:

a support frame;

adjustment carriage displaceable with respect to the support frame in a stop direction by an adjustment drive; and a plurality of stop elements arranged at a distance from one another in a transverse direction extending transversely to the stop direction; wherein:

said plurality of stop elements are adapted to be positioned in said transverse direction in different positions thereof;

said plurality of stop elements are arranged on said adjustment carriage and adjustable in said stop direction by positioning the adjustment carriage;

said stop elements each have a stop arm provided with at least first and second stop surfaces arranged at a distance from one another in said stop direction, said first stop surfaces are arranged closer than said second stop surfaces to the machine tool, said second stop surfaces are adapted to be brought by a movement of the stop element into an active position, where said second stop surfaces are protruding above a bearing surface, and said first stop elements are adapted to be brought into:
(a) a first position, in which said first stop surfaces are in an active position, and
(b) a second position, in which said second stop surfaces are in the active position thereof while said first stop surfaces are in an inactive position, beneath the bearing surface.

24. A workpiece stop device as defined in claim 23, wherein:

said stop surfaces of said plurality of stop elements are commonly moveable into the different active and inactive positions associated therewith.

25. A workpiece stop device as defined in claim 23, wherein:

said plurality of stop elements are moveable by one drive.

26. A workpiece stop device as defined in claim 23, wherein:

all of said stop elements are carried by said adjustment carriage.

27. A workpiece stop device as defined in claim 23, wherein:

said second stop surfaces are adapted to be brought by movement of said stop element into said active position thereof from an inactive position thereof where said second stop surfaces are arranged beneath the bearing surface.

* * * * *